United States Patent
Kuo et al.

(10) Patent No.: US 8,789,698 B2
(45) Date of Patent: Jul. 29, 2014

(54) PACKAGE BOX OF LIQUID CRYSTAL GLASS

(71) Applicant: Shenzhen China Star Optoelectronics Technology Co., Ltd., Shenzhen (CN)

(72) Inventors: Yicheng Kuo, Shenzhen (CN); Shihhsiang Chen, Shenzhen (CN); Chengwen Que, Shenzhen (CN); Jiahe Cheng, Shenzhen (CN); Qinjun Shi, Shenzhen (CN); Jiaxin Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 8 days.

(21) Appl. No.: 13/806,826

(22) PCT Filed: Nov. 28, 2012

(86) PCT No.: PCT/CN2012/085379
§ 371 (c)(1),
(2), (4) Date: Dec. 24, 2012

(87) PCT Pub. No.: WO2014/075352
PCT Pub. Date: May 22, 2014

(65) Prior Publication Data
US 2014/0138272 A1   May 22, 2014

(51) Int. Cl.
*B65D 81/05*   (2006.01)
*B65D 85/48*   (2006.01)
*B65D 81/107*  (2006.01)
B65D 81/02    (2006.01)
G02F 1/1333   (2006.01)

(52) U.S. Cl.
CPC .......... *B65D 81/022* (2013.01); *B65D 81/053* (2013.01); *B65D 81/02* (2013.01); *B65D 81/051* (2013.01); *B65D 85/48* (2013.01); *G02F 1/1333* (2013.01)

USPC ........... 206/449; 206/454; 206/455; 206/521; 206/591; 206/592; 206/523; 206/586; 206/587; 349/58; 349/62; 349/60; 361/679.01

(58) Field of Classification Search
CPC .... B65D 81/053; B65D 81/107; B65D 81/02; B65D 85/48; G02F 1/1333
USPC ......... 206/454–456, 564, 565, 593, 592, 523, 206/587, 586, 591; 349/149, 152, 58, 62, 349/60; 361/679.01, 679.21, 807, 808, 767, 361/681, 818; 362/396, 390; 248/316.8; 29/464

See application file for complete search history.

(56) References Cited

U.S. PATENT DOCUMENTS 3,314,584 A * 4/1967 Knapp et al. .................. 206/586
(Continued)

FOREIGN PATENT DOCUMENTS

CN           101195435 A      6/2008
(Continued)

*Primary Examiner* — Mickey Yu
*Assistant Examiner* — Gideon Weinerth
(74) *Attorney, Agent, or Firm* — Andrew C. Cheng

(57) ABSTRACT

The present invention provides a package box of liquid crystal glass, which includes a box body, a plurality of mounting sections arranged in the box body, and cushioning devices mounted to the mounting sections. The cushioning devices each include a cushioning section, a retention section connected to the cushioning section, and a projection. The mounting sections each include a first receiving channel and a through hole respectively corresponding to the retention section and the projection of the respective cushioning device. The retention sections are respectively received in the first receiving channels and the projections are respectively fit into the through hole so as to fix the cushioning devices inside the box body. The package box uses cushioning devices that are mounted inside a box in a snap-fitting manner so that the operation of assembling and disassembling the cushioning devices is simple, making it easy to re-work.

11 Claims, 2 Drawing Sheets

(56) References Cited

U.S. PATENT DOCUMENTS

| | | | | |
|---|---|---|---|---|
| 3,356,209 | A * | 12/1967 | Pezely, Jr. | 206/523 |
| 3,404,826 | A * | 10/1968 | Carmody | 206/523 |
| 3,615,006 | A * | 10/1971 | Freed | 206/454 |
| 3,701,465 | A * | 10/1972 | Richter | 206/521 |
| 3,836,043 | A * | 9/1974 | Levin | 206/504 |
| 4,061,228 | A * | 12/1977 | Johnson | 206/454 |
| 4,287,265 | A * | 9/1981 | McKnight | 267/140.3 |
| 4,602,715 | A * | 7/1986 | Sarver et al. | 206/523 |
| 4,610,355 | A * | 9/1986 | Maurer | 206/386 |
| 4,763,782 | A * | 8/1988 | Sinchok | 206/708 |
| 4,836,379 | A * | 6/1989 | Shaw | 206/523 |
| 4,892,193 | A * | 1/1990 | Thomas | 206/453 |
| 5,071,009 | A * | 12/1991 | Ridgeway | 206/586 |
| 5,339,958 | A * | 8/1994 | Taravella et al. | 206/521 |
| 5,755,331 | A * | 5/1998 | Watson | 206/586 |
| 5,857,568 | A * | 1/1999 | Speirs | 206/320 |
| 5,904,251 | A * | 5/1999 | Ogata et al. | 206/722 |
| 6,041,937 | A * | 3/2000 | Wu et al. | 206/710 |
| 6,102,206 | A * | 8/2000 | Pride | 206/454 |
| 6,175,396 | B1 * | 1/2001 | Kim et al. | 349/58 |
| 6,532,152 | B1 * | 3/2003 | White et al. | 361/692 |
| 6,644,476 | B2 * | 11/2003 | Wu | 206/586 |
| 6,840,372 | B2 * | 1/2005 | Giles et al. | 206/216 |
| 6,899,946 | B2 * | 5/2005 | Geary et al. | 428/319.3 |
| 6,909,475 | B2 * | 6/2005 | Kojima et al. | 349/58 |
| 6,975,368 | B2 * | 12/2005 | Lee | 349/58 |
| 7,006,167 | B2 * | 2/2006 | Kashimoto | 349/58 |
| 7,120,010 | B2 * | 10/2006 | Tajima | 361/679.21 |
| 7,143,901 | B1 * | 12/2006 | Groves | 211/41.14 |
| 7,306,102 | B2 * | 12/2007 | Chang | 206/523 |
| 7,341,151 | B2 * | 3/2008 | Takagi | 206/454 |
| 7,379,128 | B2 * | 5/2008 | Tsubokura et al. | 349/60 |
| 7,931,146 | B2 * | 4/2011 | Chiu et al. | 206/454 |
| 8,068,191 | B2 * | 11/2011 | Choi | 349/58 |
| 8,083,063 | B2 * | 12/2011 | Lu et al. | 206/454 |
| 8,109,480 | B2 * | 2/2012 | Lee et al. | 248/220.1 |
| 8,218,302 | B2 * | 7/2012 | Sato | 361/679.21 |
| 8,421,951 | B1 * | 4/2013 | Wang et al. | 349/58 |
| 8,427,597 | B2 * | 4/2013 | Kim et al. | 349/58 |
| 8,485,362 | B2 * | 7/2013 | Chan et al. | 206/586 |
| 2004/0182979 | A1 * | 9/2004 | Krzoska et al. | 248/316.8 |
| 2005/0161366 | A1 * | 7/2005 | Kobashi et al. | 206/586 |
| 2006/0237338 | A1 * | 10/2006 | Nakamae | 206/316.1 |
| 2007/0227935 | A1 * | 10/2007 | Saito | 206/586 |
| 2008/0002093 | A1 * | 1/2008 | Kim | 349/58 |
| 2008/0112115 | A1 * | 5/2008 | Yang | 361/681 |
| 2008/0143918 | A1 * | 6/2008 | Kim | 349/58 |
| 2010/0080020 | A1 * | 4/2010 | Lin et al. | 362/633 |
| 2010/0195016 | A1 * | 8/2010 | Koh | 349/58 |
| 2010/0236968 | A1 * | 9/2010 | De Jesus | 206/523 |
| 2010/0238373 | A1 * | 9/2010 | Kang et al. | 349/58 |
| 2011/0109832 | A1 * | 5/2011 | Ke et al. | 349/58 |
| 2012/0188739 | A1 * | 7/2012 | Lin et al. | 361/807 |
| 2013/0063677 | A1 * | 3/2013 | Zhao | 349/58 |
| 2013/0091809 | A1 * | 4/2013 | Shi | 53/475 |
| 2013/0100370 | A1 * | 4/2013 | Chen et al. | 349/58 |
| 2013/0128179 | A1 * | 5/2013 | Yu | 349/58 |
| 2013/0135553 | A1 * | 5/2013 | Cheng et al. | 349/58 |
| 2013/0215357 | A1 * | 8/2013 | Wu | 349/58 |
| 2013/0286320 | A1 * | 10/2013 | Kuo et al. | 349/58 |
| 2013/0286321 | A1 * | 10/2013 | Kuo et al. | 349/58 |
| 2013/0293803 | A1 * | 11/2013 | Chen et al. | 349/58 |
| 2013/0299375 | A1 * | 11/2013 | Chen et al. | 206/454 |
| 2013/0306514 | A1 * | 11/2013 | Hu et al. | 206/586 |
| 2013/0308074 | A1 * | 11/2013 | Park et al. | 349/58 |
| 2014/0016062 | A1 * | 1/2014 | Hatta | 349/58 |
| 2014/0022483 | A1 * | 1/2014 | Kuo et al. | 349/58 |
| 2014/0071374 | A1 * | 3/2014 | Huang | 349/58 |
| 2014/0083898 | A1 * | 3/2014 | Chen et al. | 206/523 |
| 2014/0097121 | A1 * | 4/2014 | Chen et al. | 206/586 |

FOREIGN PATENT DOCUMENTS

| | | |
|---|---|---|
| CN | 101439778 A | 5/2009 |
| CN | 201411139 Y | 2/2010 |
| CN | 101948034 A | 1/2011 |
| JP | 2009269610 A | 11/2009 |

* cited by examiner

PACKAGE BOX OF LIQUID CRYSTAL GLASS

BACKGROUND OF THE INVENTION

1. Field of the Invention

The present invention relates to the field of packaging material, and in particular to a package box of liquid crystal glass.

2. The Related Arts

In the field of manufacture of liquid crystal display devices, the manufacture of liquid crystal display devices includes a process of assembling, which assembles various components, including a liquid crystal glass, a main control circuit, and an enclosure, together. These components are each manufactured in advance and packaged for being later assembled to form a complete liquid crystal display device. The liquid crystal glass, after being manufactured, is packaged in a liquid crystal glass package box and then shipped in box to a corresponding assembling station. Commonly used package boxes include paper boxes and plastic cases. Paper boxes have better cushioning property but are of poor stiffness for serving as liquid crystal glass package boxes. Plastic cases have better structures so as to not easily have objected contained therein damaged by applications of external forces and are of low prices so as to be fit to packaging of fragile articles. However, plastic cases show poor cushioning performance so that cushioning blocks must be additionally provided inside the cases to effect cushioning.

As shown in FIGS. 1 and 2, which are schematic views showing a conventional liquid crystal glass package box, the conventional liquid crystal glass package box comprises a box body 100, mounting sections 300 arranged inside the box body 100, and cushioning blocks 500 that are mounted on the mounting sections 300 and are arranged to engage a piece of liquid crystal glass. These cushioning blocks 500 are adhesively bonded to the mounting sections 300. A packaged piece of liquid crystal glass is so set that edges thereof are positioned on the cushioning blocks 500. In shipping the liquid crystal glass, the cushioning blocks 500 provide an effective protection to the liquid crystal glass and prevent the liquid crystal glass from being damaged by external forces. Commonly used cushioning blocks 500 are often made of foaming substances, such as expandable polyethylene (EPE) and ethylene-vinyl acetate (EVA) copolymer. The package boxes, after being used, can be collected and for re-use. However, during the process of use, the cushioning blocks 500 may get damaged and must be removed and re-worked. However, since the cushioning blocks 500 are adhesively bonded to the mounting sections 300, re-working easily suffers residues of adhesive. This increases the difficulty of removing and re-working thereby lowering the efficiency of re-working.

SUMMARY OF THE INVENTION

An object of the present invention is to provide a liquid crystal glass package box, which is capable of effectively protecting liquid crystal glass and has a simple structure, is easy to re-work, and is effectively re-usable.

To achieve the object, the present invention provides a liquid crystal glass package box, comprising: a box body, a plurality of mounting sections arranged in the box body, and cushioning devices mounted to the mounting sections. The cushioning devices each comprise a cushioning section, a retention section connected to the cushioning section, and a projection. The mounting sections each comprise a first receiving channel and a through hole respectively corresponding to the retention section and the projection of the respective cushioning device. The retention sections are respectively received in the first receiving channels and the projections are respectively fit into the through hole so as to fix the cushioning devices inside the box body.

The box body comprises a top cover and a bottom case mating the top cover.

The bottom case comprises a bottom board and side boards perpendicularly connected to the bottom board. The mounting sections are mounted to the bottom board at locations corresponding to opposite ends of each of the side boards.

The bottom case and the plurality of mounting sections are integrally formed.

Each of the mounting sections comprises first and second mounting plates that are parallel to each other and first and second reinforcing plates that are connected to the first and second mounting plates.

The first and second reinforcing plates are both perpendicularly connected to the respective side board. The first and second mounting plates are parallel to the side board to which the first and second reinforcing plates are connected. The second mounting plate is arranged between the first mounting plate and the side board. The first and second mounting plates form therebetween a first receiving channel. The second mounting plate and the side board form therebetween a second receiving channel. The through hole is formed in the second mounting plate.

The cushioning devices each further comprise a connection section connecting the cushioning section and the retention section.

The connection section is perpendicularly connected to an end of the cushioning section. The retention section is perpendicularly connected to a free end of the connection section. The cushioning section, the connection section, and the retention section collectively form a U-shaped structure.

The cushioning devices are each integrally formed of EPE or EVA.

The top cover and the bottom case are both made of plastics.

The present invention also provides a liquid crystal glass package box, which comprises a box body, a plurality of mounting sections arranged in the box body, and cushioning devices mounted to the mounting sections, the cushioning devices each comprising a cushioning section, a retention section connected to the cushioning section, and a projection, the mounting sections each comprising a first receiving channel and a through hole respectively corresponding to the retention section and the projection of the respective cushioning device, the retention sections being respectively received in the first receiving channels, the projections being respectively fit into the through hole to fix the cushioning devices inside the box body;

wherein the box body comprises a top cover and a bottom case mating the top cover;

wherein the bottom case comprises a bottom board and side boards perpendicularly connected to the bottom board, the mounting sections being mounted to the bottom board at locations corresponding to opposite ends of each of the side boards;

wherein the bottom case and the plurality of mounting sections are integrally formed;

wherein each of the mounting sections comprises first and second mounting plates that are parallel to each other and first and second reinforcing plates that are connected to the first and second mounting plates;

wherein the first and second reinforcing plates are both perpendicularly connected to the respective side board, the first and second mounting plates being parallel to the side board to which the first and second reinforcing plates are connected, the second mounting plate being arranged between the first mounting plate and the side board, the first and second mounting plates forming therebetween the first receiving channel, the second mounting plate and the side board forming therebetween a second receiving channel, the through hole being formed in the second mounting plate;

wherein the cushioning devices each further comprise a connection section connecting the cushioning section and the retention section;

wherein the connection section is perpendicularly connected to an end of the cushioning section, the retention section being perpendicularly connected to a free end of the connection section, the cushioning section, the connection section, and the retention section collectively forming a U-shaped structure;

wherein the cushioning devices are each integrally formed of EPE or EVA; and wherein the top cover and the bottom case are both made of plastics.

The efficacy of the present invention is that the present invention provides a liquid crystal glass package box, which comprises cushioning devices that are mounted inside a box in a snap-fitting manner so that the operation of assembling and disassembling the cushioning devices is simple, making it easy to re-work. The package box can be effectively re-usable to lower down the packaging cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
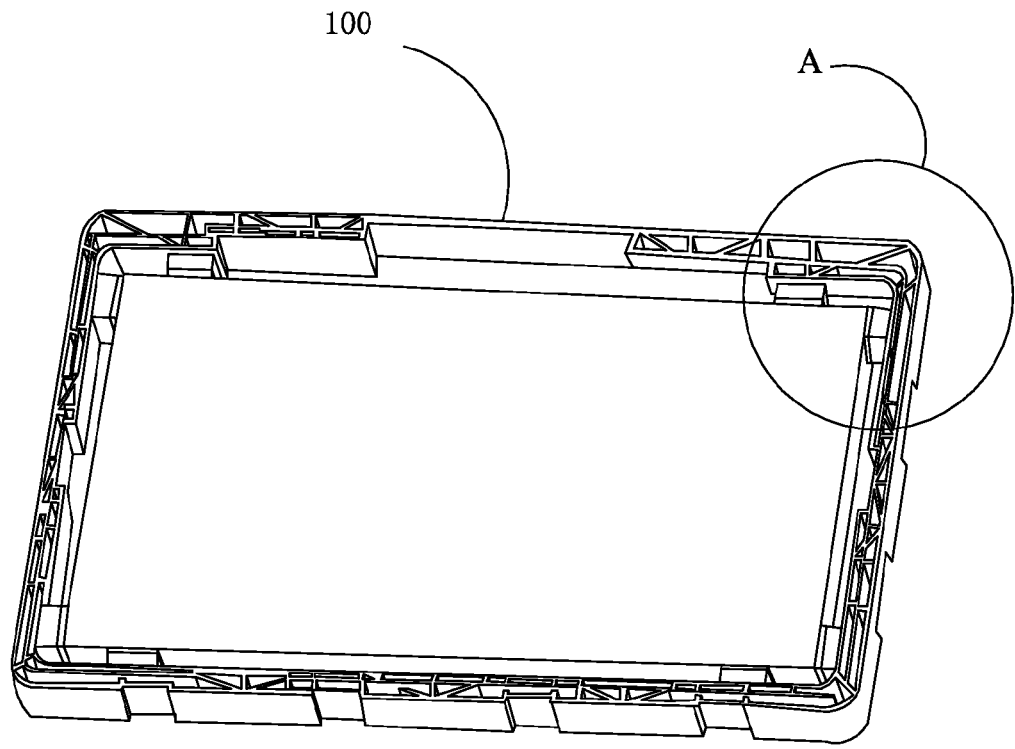
FIG. 1 is a schematic view illustrating a conventional package box of liquid crystal glass.
Figure 2:
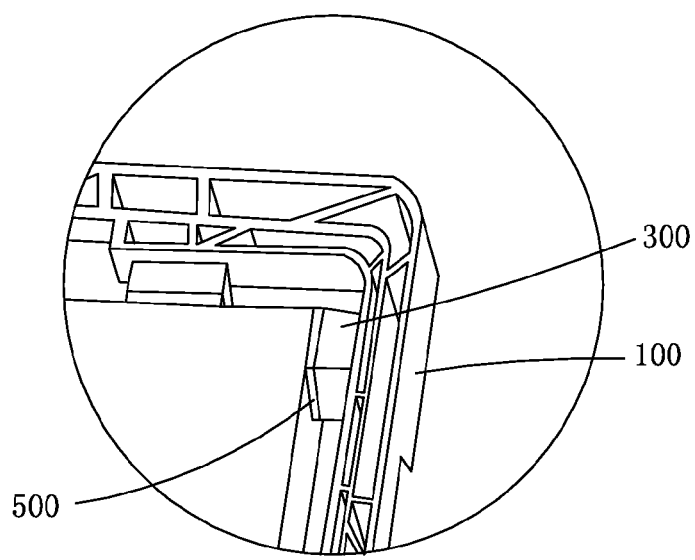
FIG. 2 is an enlarged view of circled portion A of FIG. 1.
Figure 3:
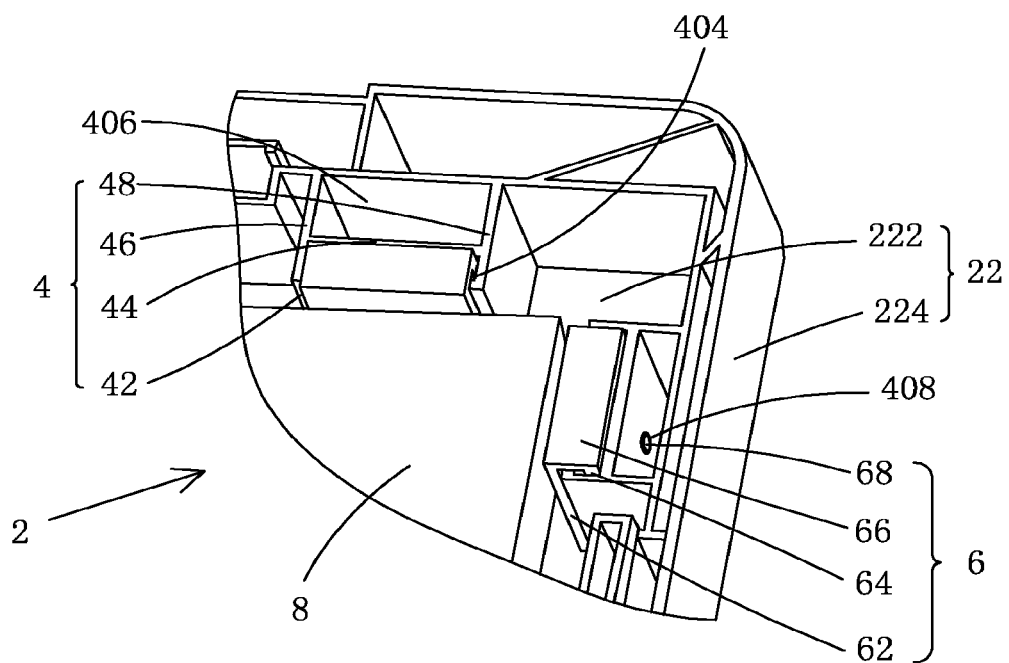
FIG. 3 is schematic view showing a portion of a liquid crystal glass package box according to the present invention.
Figure 4:
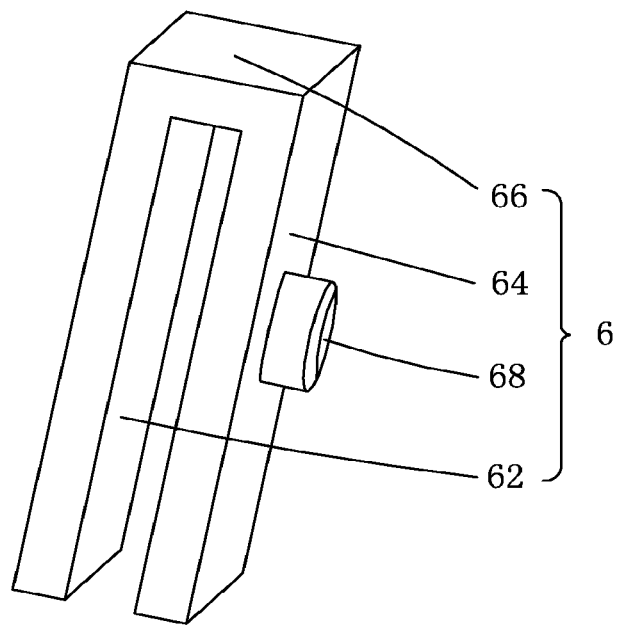
FIG. 4 is a schematic view showing the structure of a cushioning device of the liquid crystal glass package box according to the present invention.

Referring to FIGS. 3 and 4, the present invention provides a liquid crystal glass package box, which comprises a box body 2, a plurality of mounting sections 4 arranged in the box body 2, and cushioning devices 6 mounted to the mounting sections 4. The cushioning devices 6 each comprise a cushioning section 62, a retention section 64 connected to the cushioning section 62, and a projection 68. The mounting sections 4 each comprise a first receiving channel 404 and a through hole 408 respectively corresponding to the retention section 64 and the projection 68 of the respective cushioning device 6. To assemble, the retention sections 64 are respectively received in the first receiving channels 404 and the projections 68 are respectively fit into the through hole 408 to fix the cushioning devices 6 inside the box body 2. When a piece of liquid crystal glass 8 is packed in the box body 2, edges of the liquid crystal glass 8 are positioned on the cushioning sections 62. During shipping, the liquid crystal glass 8 may compress the cushioning sections 62 and the cushioning sections 62 that are made of a foamed material provide a cushioning effect to protect the liquid crystal glass 8 against damage.

The box body 2 may comprise a top cover (not shown) and a bottom case 22 mating the top cover. The mounting sections 4 are fixed inside the bottom case 22. The bottom case 22 comprises a bottom board 222 and side boards 224 perpendicularly connected to the bottom board 222. The mounting sections 4 are mounted to the bottom board 222. Preferably, the mounting sections 4 are arranged at locations corresponding to opposite ends of each of the side boards 224.

The bottom case 22 and the plurality of mounting sections 4 are integrally formed. Each of the mounting sections 4 comprises first and second mounting plates 42, 44 that are parallel to each other and first and second reinforcing plates 46, 48 that are connected to the first and second mounting plates 42, 44. The first and second reinforcing plates 46, 48 are both perpendicularly connected to the respective side board 224. The first and second mounting plates 42, 44 are parallel to the side board 224 to which the first and second reinforcing plates 46, 48 are connected. The second mounting plate 44 is arranged between the first mounting plate 42 and the side board 224. The first and second mounting plates 42, 44 form therebetween the first receiving channel 404. The second mounting plate 44 and the side board 224 form therebetween a second receiving channel 406. The through hole 408 is formed in the second mounting plate 44.

The cushioning devices 6 each further comprise a connection section 66 connecting the cushioning section 62 and the retention section 64. The connection section 66 is perpendicularly connected to an end of the cushioning section 62. The retention section 64 is perpendicularly connected to a free end of the connection section 66. The cushioning section 62, the connection section 66, and the retention section 64 collectively form a U-shaped structure. The cushioning devices 6 are each integrally formed of a foaming material, such as EPE and EVA.

To assemble, with a free end of the retention section 64 of each of the cushioning devices 6 being respectively set in alignment with the respective first receiving channel 404, a force is applied to the cushioning device 6 in a direction from top to bottom to have the retention section 64 deposited into the first receiving channel 404 and the projection 68 fit into the through hole 408 thereby mounting the cushioning devices 6 inside the .22. To disassemble, a finger is put into the second receiving channel 406 to depress the projection 68 for making the projection 68 disengaging from the through hole 408 and at the same time, the retention section 64 is forcibly lifted to have the cushioning devices 6 removed out. The disassembling and assembling operations are both easy when it is desired to make a replacement for re-working one of the cushioning devices 6 and the operation efficiency can be improved.

The top cover and the bottom case 22 are both made of plastics. The plastic box has a structure that is better than commonly used paper boxes, allows repeated use without easy breaking, is resistant to humidity and water, and provides bettered protection. And, repeated use of the package box offers a saving of packaging cost.

In summary, the present invention provides a liquid crystal glass package box, which comprises cushioning devices that are mounted inside a box in a snap-fitting manner so that the operation of assembling and disassembling the cushioning devices is simple, making it easy to re-work. The package box can be effectively re-usable to lower down the packaging cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal glass package box, comprising: a box body, a plurality of mounting sections arranged in the box body, and cushioning devices mounted to the mounting sections, at least one of the cushioning devices comprising a cushioning section, a retention section connected to the cushioning section, and a projection disposed on the retention section at a side opposite to the cushioning section, at least a corresponding one of the mounting sections comprising a first receiving channel configured for receiving and confining the retention section therein and a through hole configured for receiving the projection when the retention section is received in the first receiving channel, wherein the cushioning devices and the mounting sections engage with each other to fix the cushioning devices inside the box body.

2. The liquid crystal glass package box as claimed in claim 1, wherein the box body comprises a bottom case.

3. The liquid crystal glass package box as claimed in claim 2, wherein the bottom case comprises a bottom board and side boards perpendicularly connected to the bottom board, the mounting sections being mounted to the bottom board at locations corresponding to opposite ends of each of the side boards.

4. The liquid crystal glass package box as claimed in claim 3, wherein the bottom case and the plurality of mounting sections are integrally formed.

5. The liquid crystal glass package box as claimed in claim 1, wherein each of the mounting sections comprises first and second mounting plates that are parallel to each other and first and second reinforcing plates that are connected to the first and second mounting plates.

6. The liquid crystal glass package box as claimed in claim 5, wherein the first and second reinforcing plates are both perpendicularly connected to the respective side board, the first and second mounting plates being parallel to the side board to which the first and second reinforcing plates are connected, the second mounting plate being arranged between the first mounting plate and the side board, the first and second mounting plates forming therebetween the first receiving channel, the second mounting plate and the side board forming therebetween a second receiving channel, the through hole being formed in the second mounting plate.

7. The liquid crystal glass package box as claimed in claim 1, wherein the cushioning devices each further comprise a connection section connecting the cushioning section and the retention section.

8. The liquid crystal glass package box as claimed in claim 7, wherein the connection section is perpendicularly connected to an end of the cushioning section, the retention section being perpendicularly connected to a free end of the connection section, the cushioning section, the connection section, and the retention section collectively forming a U-shaped structure.

9. The liquid crystal glass package box as claimed in claim 1, wherein the cushioning devices are each integrally formed of EPE or EVA.

10. The liquid crystal glass package box as claimed in claim 2, wherein the bottom case is made of plastics.

11. A liquid crystal glass package box, comprising: a box body, a plurality of mounting sections arranged in the box body, and cushioning devices mounted to the mounting sections, at least one of the cushioning devices comprising a cushioning section, a retention section connected to the cushioning section, and a projection disposed on the retention section at a side opposite to the cushioning section, at least a corresponding one of the mounting sections comprising a first receiving channel configured for receiving and confining the retention section therein and a through hole configured for receiving the projection when the retention section is received in the first receiving channel, wherein the cushioning devices and the mounting sections engage with each other to fix the cushioning devices inside the box body;

wherein the box body comprises a bottom case;

wherein the bottom case comprises a bottom board and side boards perpendicularly connected to the bottom board, the mounting sections being mounted to the bottom board at locations corresponding to opposite ends of each of the side boards;

wherein the bottom case and the plurality of mounting sections are integrally formed;

wherein each of the mounting sections comprises first and second mounting plates that are parallel to each other and first and second reinforcing plates that are connected to the first and second mounting plates;

wherein the first and second reinforcing plates are both perpendicularly connected to the respective side board, the first and second mounting plates being parallel to the side board to which the first and second reinforcing plates are connected, the second mounting plate being arranged between the first mounting plate and the side board, the first and second mounting plates forming therebetween the first receiving channel, the second mounting plate and the side board forming therebetween a second receiving channel, the through hole being formed in the second mounting plate;

wherein the cushioning devices each further comprise a connection section connecting the cushioning section and the retention section;

wherein the connection section is perpendicularly connected to an end of the cushioning section, the retention section being perpendicularly connected to a free end of the connection section, the cushioning section, the connection section, and the retention section collectively forming a U-shaped structure;

wherein the cushioning devices are each integrally formed of EPE or EVA; and wherein the bottom case is made of plastics.

* * * * *